United States Patent [19]

Wu

[11] Patent Number: 5,788,261
[45] Date of Patent: Aug. 4, 1998

[54] FRAME ASSEMBLY FOR A GOLF CART

[76] Inventor: Ching-Chang Wu, No. 35-1, Jih Hsin Street, Tu Cheng Hsiang, Taipei Hsien, Taiwan

[21] Appl. No.: 956,278

[22] Filed: Oct. 23, 1997

[51] Int. Cl.[6] .......................................................... B62B 1/12
[52] U.S. Cl. ........................ 280/646; 280/652; 280/DIG. 6
[58] Field of Search ................................. 280/646, 652, 280/DIG. 6; 248/461

[56] References Cited

U.S. PATENT DOCUMENTS

| | | | |
|---|---|---|---|
| 4,911,465 | 3/1990 | Hauer | 280/646 |
| 5,074,577 | 12/1991 | Kim | 280/DIG. 6 |
| 5,496,054 | 3/1996 | Wu | 280/646 |

FOREIGN PATENT DOCUMENTS 6-19921A  7/1994  Japan ..................................... 280/652

*Primary Examiner*—Russell D. Stormer
*Assistant Examiner*—Clovia Hamilton
*Attorney, Agent, or Firm*—Varndell Legal Group

[57] ABSTRACT

A frame assembly for a golf cart, in which the side beams are coupled between two brackets on the main frame member of the frame assembly and two wheel holders, each side beam including a respective rigid rectangular tube having two extension portions at two opposite ends respectively inserted into a U-shaped frame of one brackets and a U-shaped frame of one wheel holder and pivoted thereto by a respective pivot bolt, and a rigid connecting rod inserted through the rigid rectangular tube, the rigid connecting rod having two opposite ends extended out of the rigid rectangular tube outside the extension portions and respectively inserted into a U-shaped frame of one brackets and a U-shaped frame of one wheel holder and pivoted thereto by a respective pivot bolt.

2 Claims, 4 Drawing Sheets

FRAME ASSEMBLY FOR A GOLF CART

BACKGROUND AND SUMMARY OF THE INVENTION

The present invention relates to a frame assembly for a golf cart, and more particularly to such a frame assembly in which each side beam which is coupled between one bracket and one wheel holder is comprised of a rigid rectangular tube pivotably connected between one bracket and one wheel holder, and a rigid connecting rod inserted through the rigid rectangular tube and having two opposite ends respectively pivotably connected to one bracket and one wheel holder.

FIG. 1 shows a golf cart according to the prior art. The frame assembly of this structure of golf cart comprises an elongated main frame member, a handle connected to a front end of the main frame member, a first bag cradle and a second bag cradle fixedly mounted on front and rear ends of the main frame member for carrying a golf bag with clubs, a bracket fixedly mounted on the main frame member on the middle, two wheel holders, two side beams coupled between the bracket and the wheel holders, and two ground supporting wheels respectively mounted on the wheel holders. The side beams are respectively comprised of two parallel rods. The parallel rods have a respective top end respectively pivoted to the bracket by respective pivots, and a respective bottom end respectively pivoted to the wheel holders by respective pivots. This structure of frame assembly is not durable in use because the connections between the top ends of the parallel rods, and the bracket and the connections between the bottom ends of the parallel rods and the wheel holders tend to wear out with use. Furthermore, because the parallel rods are separated from each other by an elongates gap, the side beams do not cause a sense of beauty.

The present invention has been accomplished to provide a frame assembly for a golf cart which eliminates the aforesaid drawbacks. According to one aspect of the present invention, two side beams are coupled between two brackets on the middle of the main frame member of the frame assembly and two wheel holders, each side beam comprised of a rigid rectangular tube pivotably connected between one bracket and one wheel holder, and a rigid connecting rod inserted through the rigid rectangular tube and having two opposite ends respectively pivotably connected to one bracket and one wheel holder. According to another aspect of the present invention, the brackets and the wheel holders have a respective Ushaped frame respectively covered on the two opposite ends of the rigid rectangular tubes of the side beams, so that the rigid connecting rods of the side beams are connected from sight.

DETAILED DESCRIPTION OF THE PREFERRED EMBODIMENT

Figure 1:
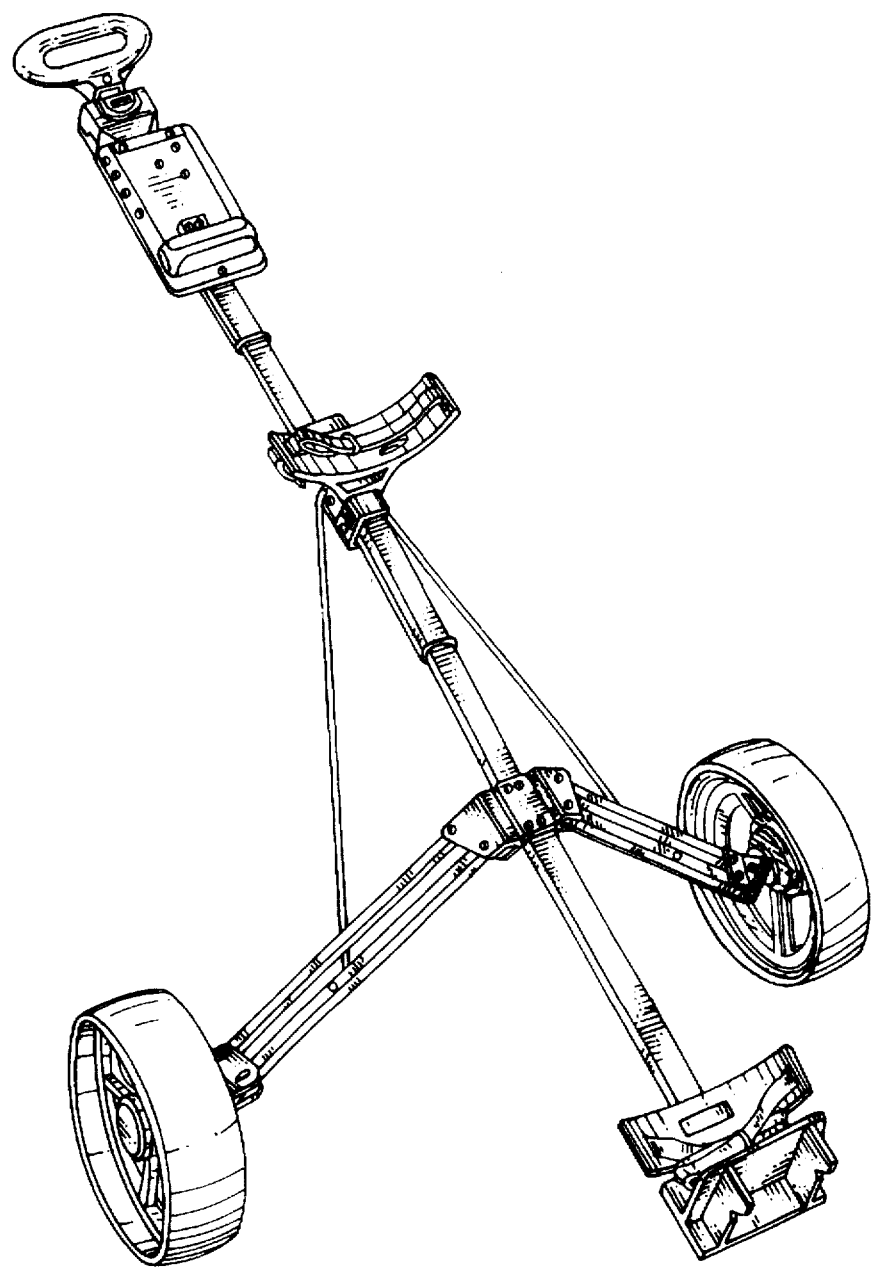
FIG. 1 is a perspective elevational view of a golf cart according to the prior art.
Figure 2:
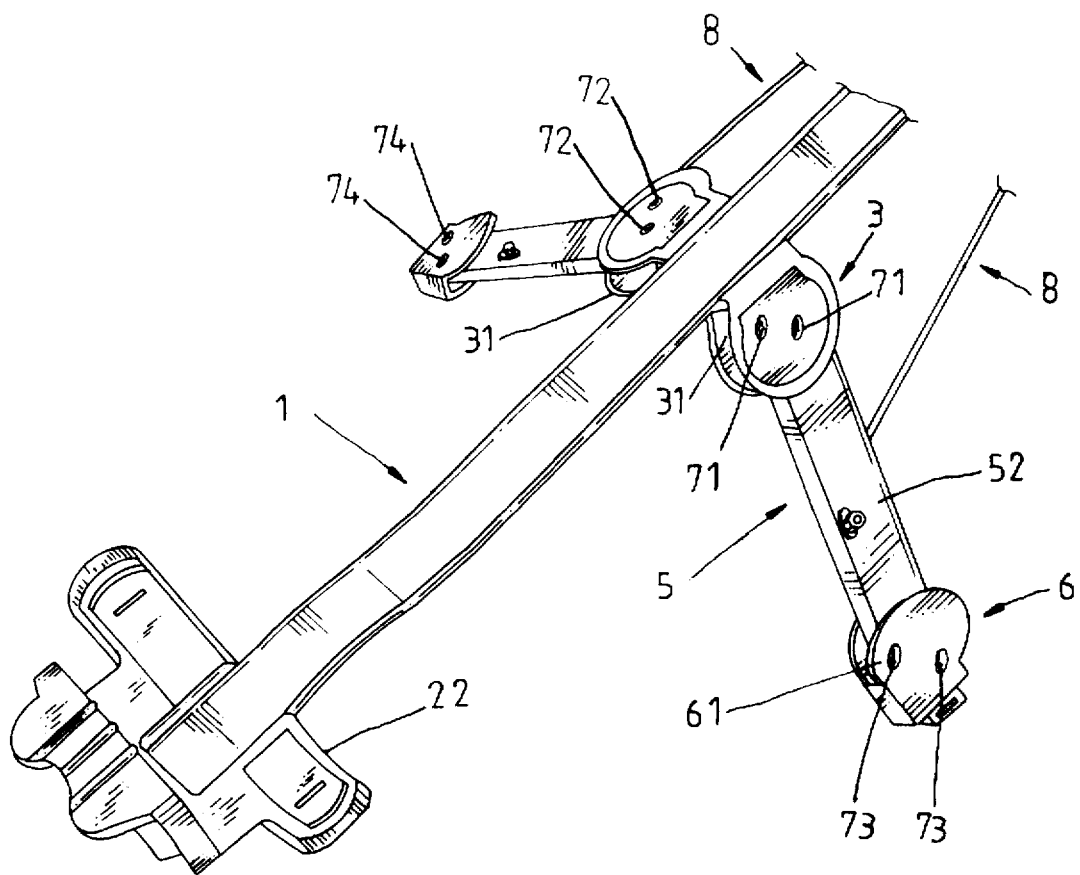
FIG. 2 is a perspective view of a part of a frame assembly for a golf cart according to the present invention.
Figure 3:
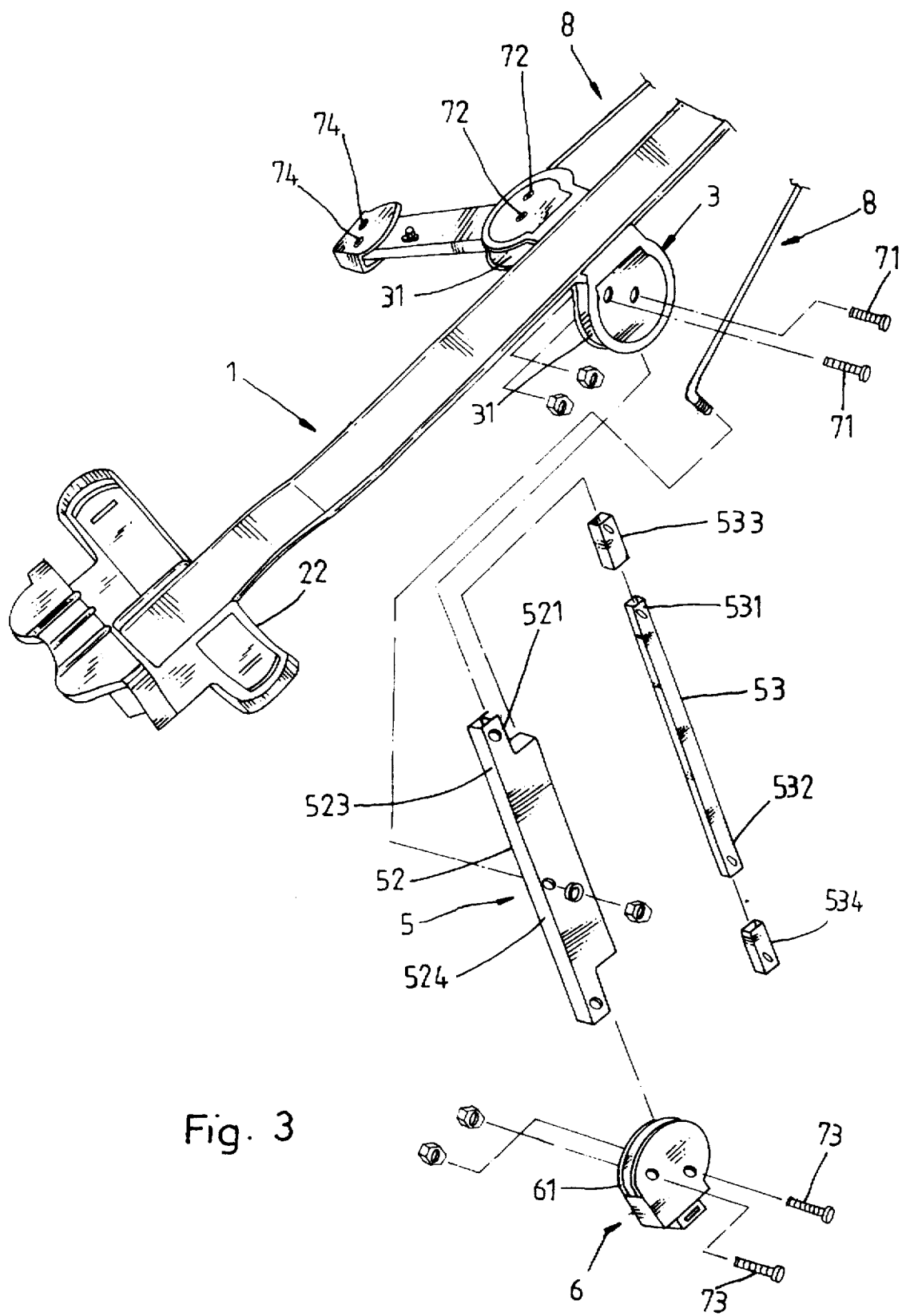
FIG. 3 is an exploded view of FIG. 2.
Figure 4:
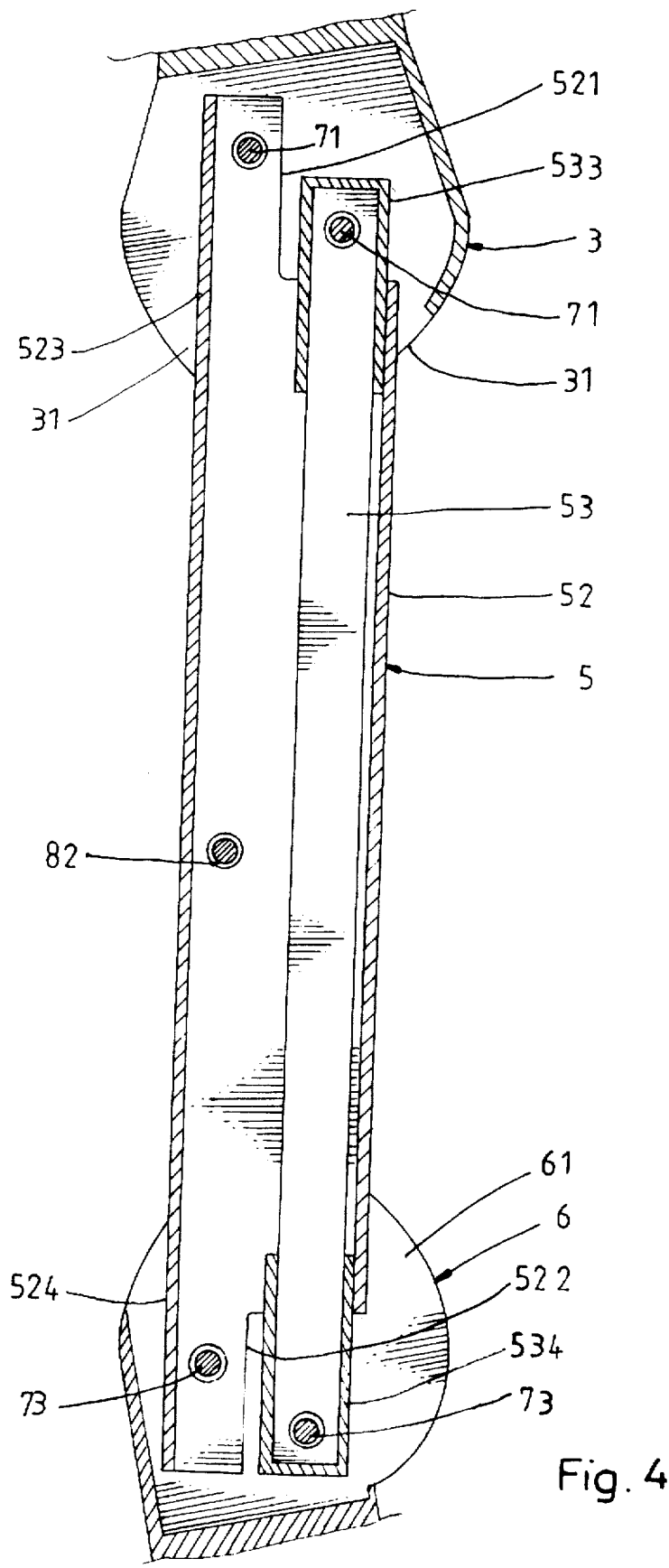
FIG. 4 is a sectional assembly view of a part of the present invention, showing the rigid rectangular tube and rigid connecting rod of one side beam connected between the U-shaped frame of one bracket and the U-shaped frame of one wheel holder.

Referring to FIGS. from 2 to 4, a frame assembly for a golf cart in accordance with the present invention is generally comprised of an elongated main frame member 1, a first bag cradle (not shown), a second bag cardle 22, two brackets 3, two side beams 5, two wheel holders 6, a handle (not shown), and two links 8.

The handle is connected to one end, namely, the front end of the main frame member 1. The first bag cradle and the second bag cradle 22 are fixedly mounted on two opposite ends of the main frame member 1 for carrying a golf bag with clubs. The brackets 3 are fixedly mounted on the main frame member 1 on the middle at two opposite sides to hold two ground supporting wheels (not shown) by the side beams 5 and the wheel holders 6. The brackets 3 have a respective substantially U-shaped frame 31 respectively connected to the side beams 5 at one end. The wheel holders 6 have a respective substantially U-shaped frame 61 respectively connected to the side beams 5 at one end opposite to the brackets 3. The side beams 5 have a respective top end respectively pivotably connected to the U-shaped frames 31 of the brackets 3 by the pivot portion 524 respectively and longitudinally extended from its two opposite ends and defining with its two opposite ends a front notch 521 and a rear notch 522. The front extension portion 523 and rear extension portion 524 are respectively inserted into the U-shaped frame 31 of one bracket 3 and the U-shaped frame 61 of one wheel holder 6 and respectively pivoted thereto by a respective pivot bolt 71; 73 or 72; 74. The rigid connecting rod 53 is inserted through the rigid rectangular tube 52, having two opposite ends 531; 532 respectively extended out of the two opposite ends of the rigid rectangular tube 52 into the front notch 521 and the rear notch 522 and respectively inserted into the U-shaped frame 31 of the corresponding bracket 3 and the U-shaped frame 61 of the corresponding wheel holder 6 and respectively pivoted thereto by a respective pivot bolt 71 or 73;72 or 74. Further two flexible and caps 533; 534 of the rigid connecting rod 53 and retained in the U-shaped frame 31 of the corresponding bracket 3 and the U-shaped frame 61 of the corresponding wheel holder 6.

The aforesaid design of side beams enables the frame assembly of the golf cart to be stably supported on the ground supporting wheels. Further, because the rigid connecting rods 53 of the side beams 5 are respectively received in the respective rigid rectangular tubes 52 and the front and rear ends of the rigid rectangular tubes 52 of the side beams 5 are respectively covered within the U-shaped frames 31 of the brackets 3 and the U-shaped frames 61 of the wheel holders 6, no gaps are viewed from the outside.

I claim:

1. A frame assembly for a golf cart, comprising:

a main frame member having a first bag cradle and a second bag cradle on two opposite ends thereof for carrying a golf bag with clubs;

two brackets fixedly mounted on said main frame on the middle, said brackets having a respective U-shaped frame adapted for holding a respective side beam;

two wheel holders adapted for holding a respective ground supporting wheel, said wheel holders having a respective U-shaped frame adapted for holding a respective side beam;

two side beams respectively coupled between the U-shaped frames of said brackets and the U-shaped frames of said wheel holders; and two links respectively coupled between said side beams and said first bag cradle;

wherein each of said side beams comprises a rigid rectangular tube coupled between one bracket and one wheel holder, and a rigid connecting rod inserted through said rigid rectangular tube and coupled between one bracket and one wheel holder, said rigid rectangular tube comprising a front extension portion and a rear extension portion respectively and longitudinally extended from two opposite ends thereof and defining with its two opposite ends a front notch and a rear notch, said front extension portion and said rear extension portion being respectively inserted into the U-shaped frame of one bracket and the U-shaped frame of one wheel holder and respectively pivoted thereto by a respective pivot bolt, said rigid connecting rod is inserted through said rigid rectangular tube, having two opposite ends respectively extended out of the two opposite ends of said rigid rectangular tube into said front notch and said rear notch and respectively inserted into the U-shaped frame of one bracket and the U-shaped frame of one wheel holder and respectively pivoted thereto by a respective pivot bolt.

2. The frame assembly of claim 1, wherein the two opposite ends of said rigid connecting rod are covered with a respective flexible end cap.

* * * * *